(12) United States Patent
Kuepfer et al.

(10) Patent No.: US 7,153,924 B2
(45) Date of Patent: Dec. 26, 2006

(54) ORGANOPOLYSILOXANE/POLYUREA/POLYURETHANE BLOCK COPOLYMERS

(75) Inventors: Juergen Kuepfer, Emmerting (DE); Oliver Schaefer, Munich (DE)

(73) Assignee: Wacker Chemie AG, Munich (DE)

( * ) Notice: Subject to any disclaimer, the term of this patent is extended or adjusted under 35 U.S.C. 154(b) by 143 days.

(21) Appl. No.: 10/854,722

(22) Filed: May 26, 2004

(65) Prior Publication Data

US 2004/0254325 A1   Dec. 16, 2004

(30) Foreign Application Priority Data

Jun. 12, 2003  (DE) ............................. 103 26 575

(51) Int. Cl.
*C08G 18/61*  (2006.01)
(52) U.S. Cl. .............................. 528/44; 528/38; 528/34
(58) Field of Classification Search .................. 528/38, 528/44, 34
See application file for complete search history.

(56) References Cited

U.S. PATENT DOCUMENTS

| 2003/0176613 A1 | 9/2003 | Hohberg et al. |
| 2004/0087752 A1 | 5/2004 | Schindler et al. |

| 2004/0210024 A1* | 10/2004 | Schafer et al. ................. 528/44 |

FOREIGN PATENT DOCUMENTS

| DE | 101 37 855 A1 | 2/2003 |
| EP | 0 250 248 | 12/1987 |
| EP | 0 697 621 | 2/1999 |
| EP | 1 336 683 | 8/2003 |
| WO | WO 95/21206 | 8/1995 |
| WO | WO 96/30431 | 10/1996 |
| WO | WO 02/077072 | 10/2002 |
| WO | WO 03/014194 | 2/2003 |
| WO | WO 03/018704 | 3/2003 |

OTHER PUBLICATIONS

English Derwent Abstract (AN 2003-268185 [26]) corresponding to WO 03/018704.
English Derwent Abstract (AN 2003-268185 [26]) corresponding to WO 03/014194.
I. Yilgör, "Segmented Organosiloxane Copolymers" POLYMER, 1984 (25), p. 1800.
English Derwent Abstract corres. to DE 101 37 855 [AN 2003-268185 [26]].

* cited by examiner

*Primary Examiner*—Kuo-Liang Peng
(74) *Attorney, Agent, or Firm*—Brooks Kushman P.C.

(57) ABSTRACT

The invention relates to a process for preparing organopolysiloxane/polyurea/polyurethane block copolymers, and also to the use of the organopolysiloxane/polyurea/polyurethane block copolymers prepared by means of the process.

11 Claims, No Drawings

ORGANOPOLYSILOXANE/POLYUREA/POLYURETHANE BLOCK COPOLYMERS

BACKGROUND OF THE INVENTION

1. Field of the Invention

The invention pertains to a process for preparing organopolysiloxane/polyurea/polyurethane block copolymers, and to the use of the organopolysiloxane/polyurea/polyurethane block copolymers prepared by means of the process.

2. Background Art

The properties of polyurethanes and silicone elastomers are complementary in many areas. Polyurethanes are notable for their outstanding mechanical strength, elasticity, and very good adhesion, abrasion resistance, and ease of processing by extrusion from the melt. Silicone elastomers, on the other hand, possess an excellent temperature stability, UV stability, and weathering stability. They retain their elastic properties at relatively low temperatures and consequently do not tend toward embrittlement. In addition they possess special water repellency and antistick ("release") surface properties.

Conventional polysiloxanes are employed for elastomers, seals, adhesives, sealants, and antistick coatings in the form of thixotropic pastes. In order to achieve a desired ultimate strength, different methods of curing the compositions have been developed, with the objectives of creating the desired structures with their associated mechanical properties. In the majority of cases, however, the polymers must be blended, for example by the addition of reinforcing additives such as pyrogenic silicas, in order to attain adequate mechanical properties. In curable systems, a distinction is generally made between high temperature vulcanizing (HTV) systems and room temperature vulcanizing (RTV) systems. In the case of the RTV compositions there are both one-component ("RTV-1") and two-component ("RTV-2") systems. In the RTV-2 systems, two components are mixed and hence catalytically activated and cured. Several different catalysts and curing mechanisms are available. Curing is normally accomplished by peroxidic crosslinking, by hydrosilylation by means of platinum catalysis, or by condensation reactions. Although such RTV-2 systems possess very long pot lives, the attainment of optimum properties requires very precise compliance with the mixing proportions of the two components, leading to increased complexity of the processing apparatus. RTV-1 systems likewise may cure by peroxidic crosslinking, by hydrosilylation by means of platinum catalysis, or by condensation. In this case, however, either an additional processing step for adding and compounding the crosslinking catalyst is necessary, or the compositions have only a limited pot life. A feature common to all these systems, however, is that the products are insoluble after processing and also cannot be recycled.

Consequently, the combination of urethane polymers and silicone polymers ought to provide access to materials having good mechanical properties, yet which at the same time feature processing possibilities which are greatly simplified as compared with the silicones, while continuing to possess the positive properties of the silicones. The combination of the advantages of both systems may therefore lead to compounds having low glass transition temperatures, low surface energies, improved thermal and photochemical stabilities, low water absorption, and physiological inertness. However, polyurethanes and silicones have limited compatibility, and often segregate into separate phases which together do not offer the desired improved characteristics.

Investigations have been carried out in order to overcome the poor phase compatibilities of the two systems. Adequate compatibilities were achievable in only a few special cases through the production of polymer blends. Not until the preparation of polydiorganosiloxane-urea block copolymers, described in I. Yilgör, POLYMER, 1984 (25), p. 1800, and in EP-A-250248, was it possible to achieve this objective. The reaction of the polymer building blocks takes place ultimately by a comparatively simple polyaddition, similar to that employed for the preparation of polyurethanes and polyureas. As starting materials, bisaminoalkyl-terminated polysiloxanes are used as siloxane building blocks for the siloxane-urea copolymers. They form the soft segments in the copolymers, analogous to the polyethers in pure polyurethane systems. As hard segments use is made of customary diisocyanates, which can also be modified by adding diamines such as 1,6-diaminohexane, or dihydroxy compounds such as butanediol, in order to achieve higher strengths. The reaction of the bisamino compounds with isocyanates is spontaneous and generally requires no catalyst.

The silicone building blocks and isocyanate building blocks of the polymer are readily miscible within a wide range. The mechanical properties are determined by the ratio of the different polymer blocks, e.g. the soft silicone segments and the hard urea segments, and, critically, by the diisocyanate used. As a result of the strong interactions of the hydrogen bonds between the urea units these compounds possess a defined softening point, and the materials obtained are thermoplastic.

Both in Yilgör et al. and in EP-0 250 248 A2 the bisaminoalkyl-functional siloxanes used as starting material are prepared by way of equilibration reactions. EP 0 250 248 A2 describes bisaminoalkyl-terminated polydimethylsiloxane chains which even in relatively high molecular weight ranges, possess sufficient purity to ensure the high molecular weights that are required for good mechanical properties in the end polymers in the reaction with diisocyanates. These bisaminoalkyl-terminated silicones are prepared exclusively by way of an equilibration reaction carried out in a critical manner employing specific equilibration catalysts.

Difunctional silicone oils prepared by way of equilibration reactions, however, have a number of disadvantages. The equilibration reaction described in EP 0 250 248 A2 is a very protracted reaction. Additionally, it is necessary to use a very expensive starting material such as bisaminopropyltetramethyldisiloxane, together with specific catalysts, which must be synthesized in an extra step. These requirements make the process unfavorable from an economic standpoint. Furthermore, at the end of the equilibration reaction, the catalyst must be either thermally deactivated or neutralized, leaving catalyst residues and hence impurities in the end product, with adverse consequences for the thermal stability of the materials thus produced. These impurities are likewise responsible for a strong intrinsic odor in the materials synthesized from components containing them. It is also necessary to remove about 15% of cyclic siloxanes. From a technical standpoint, however, it is generally not possible to achieve complete removal, and thus cyclic siloxanes remain in the product and may exude from downstream products. In the course of thermal treatment the silicones prepared in this way exhibit a tendency to take on a clearly visible yellow tinge.

From DE 101 37 855 A1 it is known to prepare bisaminoalkyl-terminated siloxanes, which may be used to prepare siloxane-urea copolymers, by reacting hydroxyl-terminated siloxanes with special reactive aminosilanes. This gives materials of heightened purity which are distinguished by a simpilifed preparation process and by good mechanical and optical properties. A disadvantage here again, however, is the separate preparation of a bisaminosilicone from separate starting materials. This bisaminosilicone may easily be contaminated, may gel as a result of formation of carbamates, or may yellow under the influence of oxygen.

It would be desirable to provide a process which yields contamination-free siloxane-urea copolymers which have high molecular weights and, consequently, favorable mechanical properties such as high tensile strength and elongation at break, and which exhibit good processing properties such as low viscosity and absence of solvents. Additionally the process ought ideally to be achievable without substantial technical expenditure, and the materials ought to be preparable from readily available starting materials, in order to be able to compete economically with existing systems. By dispensing with intermediates, technical expenditure can be minimized, and the possibility of contamination of the product and of deviations from process parameters can be reduced as well.

SUMMARY OF THE INVENTION

It has now been surprisingly discovered that organopolysiloxane/polyurea/polyurethane block copolymers can be readily prepared by reacting a bis[hydroxyl]-functional siloxane or polysiloxane, an organic diisocyanate, and an aminosilane containing moieties of the structure

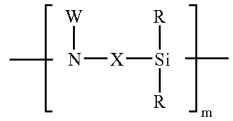

where m is from 1 to 4000, and R are optionally halogen-substituted hydrocarbon radicals. The starting materials may be reacted in a one pot procedure, for example in a conventional extruder.

DETAILED DESCRIPTION OF THE PREFERRED EMBODIMENT(S)

The invention thus provides a process for preparing organopolysiloxane/polyurea/polyurethane block copolymers of the general formula (1):

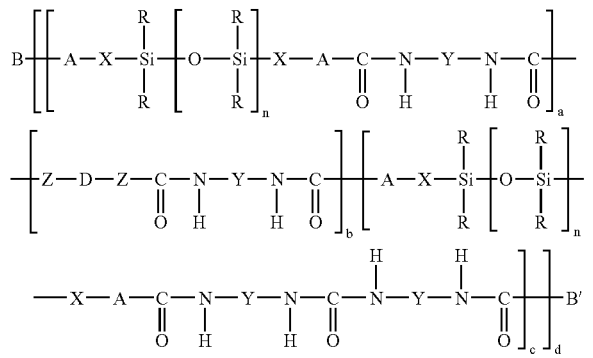

which comprises polymerizing a compound containing an aminosilane structure of the general formula (2):

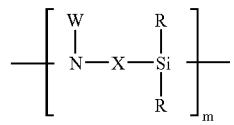

with an organosilicon compound of the general formula (3)

and at least one diisocyanate of the general formula (4)

OCN—Y—NCO, where
R is a monovalent hydrocarbon radical optionally substituted by fluorine or chlorine and having 1 to 20 carbon atoms,
X is an alkylene radical having 1 to 20 carbon atoms, in which nonadjacent methylene units are optionally replaced by —O— groups, or an arylene radical having 6 to 22 carbon atoms,
A is an oxygen atom or an amino group —NR'—,
Z is an oxygen atom or an amino group —NR'—,
R' is hydrogen, an alkyl radical having 1 to 10 carbon atoms, or an aryl radical having 6 to 22 carbon atoms,
Y is a divalent hydrocarbon radical optionally substituted by fluorine or chlorine and having 1 to 20 carbon atoms,
W is hydrogen, a substituted or unsubstituted hydrocarbon radical, preferably a $C_{1-20}$ hydrocarbon radical, or a radical $R_2Si$—X—$NH_2$,
D is an alkylene radical optionally substituted by fluorine, chlorine, $C_1$–$C_6$-alkyl or $C_1$–$C_6$-alkyl ester, and having 1 to 700 carbon atoms, in which nonadjacent methylene units are optionally replaced by —O—, —COO—, —OCO—, or —OCOO— groups, or an arylene radical having 6 to 22 carbon atoms,
B, B' independently of each other are a reactive or nonreactive end group bonded covalently to the polymer,
n is a number from 1 to 4000,
m is a number form 1 to 4000,
a is a number which is at least 1,
b is a number from 0 to 40,
c is a number from 0 to 30, and
d is a number greater than 0.

The process of the invention has the advantage over the prior art processes that no intermediate need be isolated or further purified. Additionally, the equilibration reaction to prepare the starting materials, which is necessary according to EP 0 250 248 A1, is omitted, as a result of which the overall process is accelerated considerably. In addition it is possible to do without the expense of catalysts required for the equilibration reaction, and their subsequent deactivation. thus, for the first time, products can be obtained which, when compared to prior art products, contain no catalyst residues and can therefore exhibit both greater thermal stability and also lower intrinsic odor. Furthermore, since there is no need to remove cyclic siloxanes, the block copolymer products generally have less of a tendency to take on a yellow tinge.

Ideally the silanes of the general formula (2), the starting materials containing silanol groups, and the polyisocyanates, are employed in equimolar proportions, since in this way maximum molecular weights can be achieved. For this purpose, preferably, the amount of active hydrogen in the silanol-terminated starting material is determined, for example, by titration for example, so as to be able to add an equimolar amount of heterocycles. In order to obtain particular effects or molecular weights, however, it is possible to add one or more of the three components to the reactor in an excess or deficit amount.

Preferably R is a monovalent hydrocarbon radical which has 1 to 6 carbon atoms and is in particular, unsubstituted. Particularly preferred radicals R are the methyl, ethyl, vinyl, and phenyl radicals.

X is preferably an alkylene radical having 2 to 10 carbon atoms. The alkylene radical X is preferably not interrupted by heteroatoms.

A is preferably an NH group.

Z is preferably an oxygen atom or an NH group.

Y is preferably a hydrocarbon radical having 3 to 13 carbon atoms, and which is preferably unsubstituted. Y is preferably an aralkylene radical or a linear or cyclic alkylene radical.

D is preferably an alkylene radical having at least 2 carbon atoms, more preferably at least 4 carbon atoms, and preferably not more than 12 carbon atoms. D can also preferably be a polyoxyalkylene radical, especially a polyoxyethylene radical or polyoxypropylene radical preferably having at least 20, more preferably at least 100 carbon atoms, and preferably not more than 800, more preferably not more than 200 carbon atoms. The radical D is preferably unsubstituted.

B is preferably a functional or nonfunctional organic or organosilicon radical. For example, B may be an organosilyl group such as an alkylsilyl, alkoxysilyl or oximosilyl group, preferably having 1 to 4 carbon atoms in the alkyl moieties, such as a methoxy- or ethoxysilyl group. B may also be a hydrogen or an acyl group attached to the polymer via covalent bonds. B may also be a free-radically or ionically polymerizable radical such as a vinyl, acryloyl, methacryloyl, acrylamide or methacrylamide radical, or may be an epoxy radical, for example as a propylene oxide radical. Additionally, B may be an optionally substituted alkyl group preferably having 1 to 20 carbon atoms, an optionally substituted aryl group or alkylaryl group, preferably having 6 to 22 carbon atoms. With particular preference, B is a methoxysilyl group, ethoxysilyl group, hydrogen, an aminoalkyl group, or a group containing an isocyanate radical. The radicals A and B may additionally form an isocyanate radical.

B' is preferably a functional or nonfunctional organic or organosilicon radical. For example, B' may be an organosilyl group, hydrogen, an aminoalkyl group, hydroxyl group, or an NCO group, attached to the polymer via covalent bonds. B' may additionally be a free-radically or ionically polymerizable radical, such as a vinyl, acryloyl, methacryoyl, acrylamide or methacrylamide radical, or may be an epoxy radical such as a propylene oxide radical. In addition, B' may be an optionally substituted alkyl group preferably having 1 to 20 carbon atoms, or an optionally substituted aryl group or alkylaryl group preferably having 6 to 22 carbon atoms. With particular preference, B' is a methoxysilyl group, ethoxysilyl group, hydrogen, an aminoalkyl group, a hydroxyl group or a group containing an isocyanate radical.

For the subscripts n, m, a, b, and c: n is preferably at least 3, more preferably at least 25, and preferably not more than 800, more preferably not more than 400, and most preferably not more than 250; m is preferably 1; a is preferably more than 50; if b is other than 0, b is preferably not more than 50, in particular not more than 25; and c is preferably not more than 10, in particular not more than 5.

The compounds which contain an aminosilane element of the general formula (2) can be either linear or cyclic compounds, low molecular weight or polymeric compounds, as well as alkoxysilanes or silazanes. Preferred but not limiting examples are:

H$_3$C—O—Si(CH$_3$)$_2$—CH$_2$—NH$_2$, H$_3$C—H$_2$C—O—Si(CH$_3$)$_2$—CH$_2$—NH$_2$H$_3$C—O—Si(CH$_3$)$_2$—CH$_2$—NH(C$_6$H$_{11}$), H$_3$C—H$_2$C—O—Si(CH$_3$)$_2$—CH$_2$—NH(C$_6$H$_{11}$), H$_3$C—O—Si(CH$_3$)$_2$—(CH$_2$)$_3$—NH$_2$, H$_3$C—H$_2$C—O—Si(CH$_3$)$_2$—(CH$_2$)$_3$—NH$_2$, H$_3$C—O—Si(CH$_3$)$_2$—(CH$_2$)$_3$—NH(C$_6$H$_{11}$), H$_3$C—H$_2$C—O—Si(CH$_3$)$_2$—(CH$_2$)$_3$—NH(C$_6$H$_{11}$),

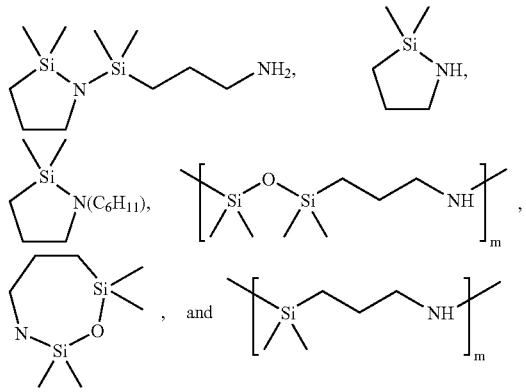

Of these, preference is given, on grounds of reactivity, to either silazanes or aminomethylalkoxysilanes.

The polydiorganosiloxane-urea copolymers of the general formula (1) exhibit high molecular weights and good mechanical properties in combination with good processing properties.

Primarily through the use of chain extenders such as dihydroxy compounds or water in addition to the urea groups already present, it is possible to achieve a distinct improvement in mechanical properties. In this way, it is possible to obtain materials, which in terms of their mechanical properties, are entirely comparable with conventional silicone rubbers but have an increased transparency and do not require the incorporation of any additional active filler.

If b is at least 1, it is possible in a second step, to employ up to 95 percent by weight, based on all of the components employed, of chain extenders, preferably selected from among organic diamines, isocyanate-blocked hydroxy compounds, dihydroxy compounds, or mixtures thereof.

The chain extenders preferably have the general formula (6)

$$HZ\text{-}D\text{-}ZH \qquad (6)$$

where D and Z have the above definitions. If Z is oxygen, the chain extender of the general formula (6) can also be reacted with diisocyanate of the general formula (4) prior to reaction in a second step.

The copolymer of the general formula (1) preferably contains, based on the sum of the urethane groups and urea groups, at least 50 mol %, more preferably at least 75 mol %, of urea groups.

Examples of the diisocyanates of the general formula (4) that may be used include aliphatic compounds such as isophorone diisocyanate, 1,6-hexamethylene diisocyanate, 1,4-tetramethylene diisocyanate, and 4,4'-methylenedicyclohexyl diisocyanate; aromatic compounds such as 4,4'-methylenediphenylene diisocyanate, 2,4-toluene diisocyanate, 2,5-toluene diisocyanate, 2,6-toluene diisocyanate, m-phenylene diisocyanate, p-phenylene diisocyanate, m-xylene diisocyanate, tetramethyl-m-xylene diisocyanate, or mixtures of these isocyanates. Examples of commercially available compounds are the diisocyanates of the DESMODUR® series (H, I, M, T, W) from Bayer AG, Germany. Preference is given to aliphatic diisocyanates in which Y is an alkylene radical, since these lead to materials which show improved UV stabilities, which is an advantage in the case of exterior applications of the polymers.

The $\alpha,\omega$-OH-terminated alkylenes of the general formula (6) are preferably polyalkylenes or polyoxyalkylenes. They are preferably substantially free from contaminations with polyoxyalkylenes with a functionality of one, or of three or more. In other words, these compounds should be substantially difunctional. In this context it is possible to use polyetherpolyols, polytetramethylenediols, polyesterpolyols, polycaprolactonediols, $\alpha,\omega$-OH-terminated polyalkylenes based on polyvinyl acetate, polyvinyl acetate-ethylene copolymers, polyvinyl chloride copolymers, or polyisobutyldiols. Preference is given to using polyoxyalkylene glycols, with particular preference, polyoxypropylene glycols. Compounds of this kind are available commercially, as base materials, inter alia, for flexible polyurethane foams and for coating applications, with molecular weights $M_n$ of up to more than 10,000 Da or higher. Examples thereof are the BAYCOLL® polyetherpolyols and polyesterpolyols from Bayer AG, Germany or the Acclaim® polyetherpolyols from Bayer, USA. It is also possible to use monomeric $\alpha,\omega$-alkylenediols, such as ethylene glycol, propanediol, butanediol or hexanediol. As dihydroxy compounds for the purposes of the invention it is additionally possible to consider bishydroxyalkyl silicones, available from Goldschmidt under the name Tegomer® H—Si 2111, 2311, and 2711. The water content of the bishydroxyalkyl silicones selected is preferably below 1% by weight and most preferably below 0.1% by weight.

The above-described copolymers of the general formula (1) can be prepared either in solution or without solvent, continuously or batchwise. What is essential is that for the chosen polymer mixture under the reaction conditions the comixing of the constituents is optimum and homogeneous and any incompatibility between the phases is prevented by means of solubilizers. The preparation depends on the solvent used. Where the fraction of the hard segments such as urethane units or urea units is large, it may be necessary to choose a solvent having a high solubility parameter such as dimethylacetamide. For the majority of syntheses tetrahydrofuran (THF) has proven sufficiently suitable.

Preferably all of the constituents are dissolved in an inert solvent. The reaction can preferably be carried out by sequential addition of the components, in the form of a multistage synthesis, or, with particular preference, by mixing the components employed, in the form of a single-stage reaction.

In another preferred embodiment the process of the invention is carried out without the addition of solvents. For the reaction without solvent the homogenization of the mixture is of critical importance for the reaction. Additionally the polymerization may also be controlled through the choice of reaction sequence in a staged synthesis.

The process of the invention for preparing the copolymers takes place preferably with the exclusion of moisture and under inert gas such as nitrogen or argon, in order to ensure better reproducibility.

As is normally the case with the preparation of polyurethanes the reaction preferably takes place with addition of a catalyst. Suitable catalysts for the preparation are dialkyltin compounds such as dibutyltin dilaurate or dibutyltin diacetate, or tertiary amines such as N,N-dimethylcyclohexanamine, 2-dimethylaminoethanol, or 4-dimethylaminopyridine.

Preferred applications of the organopolysiloxane/polyurea/polyurethane block copolymers of the general formula (1) are their uses as a constituent in adhesives and sealants, as a base material for thermoplastic elastomers such as cable sheathing, hoses, seals, keyboard mats, for membranes such as selectively gas-permeable membranes, as additives in polymer blends, for coating applications, e.g., in antistick coatings, tissue-compatible coatings, flame-retarded coatings, and as biocompatible materials. Further application possibilities include additives for polymer processing, antifouling coatings, cosmetics, bodycare products, paint additives, as an auxiliary in laundry detergents, in treatment of textiles, for the modification of resins, or for bitumen modification.

Additional uses of these thermoplastic materials include adhesives, as material for fibers, as plastics additives, e.g., as impact modifiers or flame retardants, as a material for defoamer formulations, as a high-performance polymer (thermoplastic, thermoplastic elastomer, elastomer), as packaging material for electronic components, in insulating materials or shielding materials, in cable sheathing, in antifouling materials, as an additive for scouring, cleaning or polishing products, as an additive for bodycare compositions, as a coating material for wood, paper, and board, as a mold release agent, as a biocompatible material in medical applications such as contact lenses, as a coating material for textile fibers or textile fabric, as a coating material for natural substances such as leather and furs, for example, as a material for membranes and as a material for photoactive systems, for example, for lithographic techniques, optical data securement or optical data transmission, as an additive for improving the mechanical properties of polymers such as scratch resistance or tensile strengths, for example, or as an extrusion aid in the processing of thermoplastics.

All of the above symbols of the above formulae have their definitions in each case independently of one another.

In the examples below, unless indicated otherwise in each case, all amounts and percentages are given by weight and all pressures are 0.10 MPa (abs.). All viscosities were determined at 20° C. Molecular weights were determined by means of GPC in toluene (0.5 ml/min) at 23° C. (column: PLgel Mixed C+PLgel 100 A, detector: RI ERC7515).

EXAMPLE 1

Separate Amino-Functional Silicone Preparation

A 2000 ml flask with dropping funnel and reflux condenser was charged with 1500 g of bishydroxy-terminated polydimethylsiloxane (molar weight 3000 g/mol). Subsequently at room temperature 116 g of 1-(3-aminopropyl-1, 1-dimethylsilyl)-2,2-dimethyl-1-aza-2-silacyclopentane were added dropwise and the mixture was then left to stand for 2 hours. This gave a bisaminopropyl-terminated polydimethylsiloxane having a molecular weight of 3200 g/mol which according to $^{29}$Si NMR was free of Si—OH groups.

EXAMPLE 2

Separate Amino-Functional Silicone Preparation

A 2000 ml flask with dropping funnel and reflux condenser was charged with 1080 g of bishydroxy-terminated polydimethylsiloxane (molar weight 10,800 g/mol). Subsequently at a temperature of 60° C. 23.2 g of 1-(3-aminopropyl-1,1-dimethylsilyl)-2,2-dimethyl-1-aza-2-silacyclopentane were added dropwise and the mixture was then stirred at 60° C. for 5 hours. Cooling gave a bisaminopropyl-terminated polydimethylsiloxane having a molecular weight of 11,000 g/mol which according to $^{29}$Si NMR was free of Si—OH groups.

EXAMPLE 3

Copolymer Preparation from Separately Prepared Amino-Functional Silicone: Solution Polymerization A 250 ml flask with dropping funnel and reflux condenser was charged with 32 g of bisaminopropyl-terminated polydimethylsiloxane from Example 1 (molar weight 3200 g/mol) in a solvent mixture made up of 80 ml of dry THF and 20 ml of dimethylacetamide. Subsequently at room temperature a solution of 2.22 g of isophorone diisocyanate in 20 ml of dry THF was added dropwise and the mixture was then boiled under reflux for 1 hour. After the solution had been cooled the polymer was precipitated by dropwise introduction into hexane. This gave a copolymer having a molecular weight of $M_w$ 132,000 g/mol, which exhibited a softening range at 94° C. by Thermomechanical Analysis (TMA).

Examples 4

Copolymer Preparation from Separately Prepared Amino-Functional Silicone; Neat Polymerization In a twin-screw extruder from Collin, Ebersberg with 4 heating zones, under a nitrogen atmosphere, diisocyanate was metered into the first heating zone and bisaminopropyl-terminated polydimethylsiloxane was metered into the second heating zone. The temperature profile of the heating zones was programmed as follows: zone 1: 30° C., zone 2: 100° C., zone 3: 150° C., zone 4: 140° C. The rotational speed was 50 rpm. The diisocyanate (methylenebis(4-isocyanatocyclohexane)) was metered into zone 1 at 304 mg/min and the bisaminopropyl-terminated polydimethylsiloxane (molar weight 3200 g/mol) was metered into zone 2 at 3.5 g/min. The material taken off at the die of the extruder was a polydimethylsiloxane-polyurea block copolymer having a molar weight $M_w$ of 110,000 g/mol and a softening temperature of 126° C.

EXAMPLE 5

Concerted Solution Copolymerization

A 250 ml flask with dropping funnel and reflux condenser was charged with 30 g of bishydroxy-terminated polydimethylsiloxane from Example 1 (molar weight 3000 g/mol) and 2.3 g of 1-(3-aminopropyl-1,1-dimethylsilyl)-2,2-dimethyl-1-aza-2-silacyclopentane in a solvent mixture made up of 80 ml of dry toluene and 20 ml of dimethylacetamide. Subsequently at room temperature a solution of 22.2 g of isophorone diisocyanate in 20 ml of dry toluene was added dropwise and the mixture was then boiled under reflux for 1 hour. After the solution had been cooled the polymer was precipitated by dropwise introduction into hexane. This gave a copolymer having a molecular weight $M_w$ of 114,000 g/mol, which exhibited a softening range at 97° C. by Thermomechanical Analysis (TMA).

EXAMPLE 6

Concerted Neat Polymerization

In a twin-screw extruder from Collin, Ebersberg with 7 heating zones, under a nitrogen atmosphere, 1-(3-aminopropyl-1,1-dimethylsilyl)-2,2-dimethyl-1-aza-2-silacyclopentane was metered into the first heating zone and bishydroxy-terminated polydimethylsiloxane was metered into the second heating zone. The temperature profile of the heating zones was programmed as follows: zone 1: 30° C., zone 2: 100° C., zone 3: 160° C., zone 4: 180° C., zone 5: 180° C., zone 6: 140° C., zone 7: 130° C. The rotational speed was 50 rpm. The diisocyanate (methylenebis(4-isocyanatocyclohexane)) was metered into zone 2 at 888 mg/min, the bishydroxy-terminated polydimethylsiloxane (molar weight 3000 g/mol) was metered into zone 1 at 12.0 g/mol, and the silane was metered into zone 1 at 920 mg/min. The material taken off at the die of the extruder was a polydimethylsiloxane-polyurea block copolymer having a molar weight $M_w$ 125,000 g/mol and a softening temperature of 126° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Process for preparing organopolysiloxane/polyurea/polyurethane block copolymers of the formula (1):

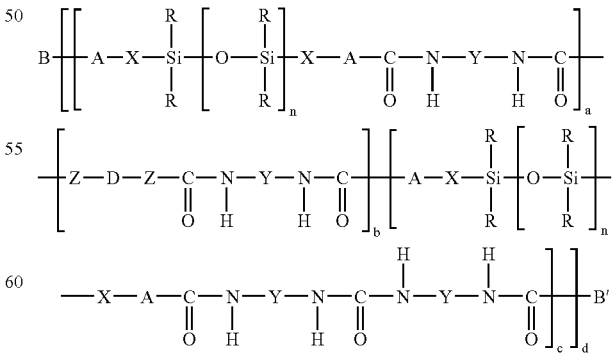

comprising polymerizing in a single stage reaction, at least one compound containing an aminosilane structure of the formula (2):

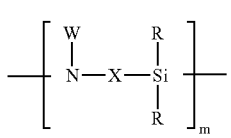

(2)

with an organosilicon compound of the formula (3)

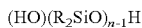

(3)

and at least one diisocyanate of the formula (4)

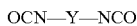

(4), and optionally one or more chain extenders having isocyanate-blocked hydroxyl groups, amine groups, or hydroxyl groups attached to an alkylene residue D
where
- R is a monovalent $C_{1-20}$ hydrocarbon radical optionally substituted by one or more of fluorine or chlorine,
- X is a $C_{1-20}$ alkylene radical in which nonadjacent methylene units are optionally replaced by —O—, or is a $C_{6-22}$ arylene radical,
- A is an oxygen atom or an amino group —NR'—,
- Z is an oxygen atom or an amino group —NR'—,
- R' is hydrogen, a $C_{1-10}$ alkyl radical, or a $C_{6-22}$ aryl radical,
- Y is a divalent $C_{1-20}$ hydrocarbon radical optionally substituted by one or more of fluorine or chlorine,
- W is hydrogen, a substituted hydrocarbon radical, or a radical $R_2Si$—X—$NH_2$,
- D is a $C_{1-700}$ alkylene radical optionally substituted by one or more of fluorine, chlorine, $C_1$–$C_6$-alkyl or $C_1$–$C_6$-alkyl ester in which nonadjacent methylene units of said alkylene radical are optionally replaced by —O—, —COO—, —OCO—, or —OCOO— groups, or is a $C_{6-22}$ arylene radical,
- B, B' are, independently, reactive or nonreactive end groups attached covalently to the copolymer,
- n is a number from 1 to 4000,
- m is a number form 1 to 4000,
- a is a number which is at least 1,
- b is a number from 0 to 40,
- c is a number from 0 to 30, and
- d is a number greater than 0.

2. The process of claim 1, wherein the silanes of the formula (2), the starting materials containing silanol groups, and the polyisocyanate(s) are used in equimolar proportions.

3. The process of claim 1, wherein the silanes of the formula (2) are linear or cyclic compounds, low molecular weight or polymeric compounds, alkoxysilanes or silazanes.

4. The process of claim 1, wherein the silanes of the formula (2) are selected from the group consisting of:
$H_3C$—O—$Si(CH_3)_2$—$CH_2$—$NH_2$, $H_3C$—$H_2C$—O—Si$(CH_3)_2$—$CH_2$—$NH_2H_3C$—O—$Si(CH_3)_2$—$CH_2$—NH$(C_6H_{11})$, $H_3C$—$H_2C$—O—$Si(CH_3)_2$—$CH_2$—NH$(C_6H_{11})$, $H_3C$—O—$Si(CH_3)_2$—$(CH_2)_3$—$NH_2$, $H_3C$—$H_2C$—O—$Si(CH_3)_2$—$(CH_2)_3$—$NH_2$, $H_3C$—O—Si$(CH_3)_2$—$(CH_2)_3$—NH$(C_6H_{11})$, $H_3C$—$H_2C$—O—Si$(CH_3)_2$—$(CH_2)_3$—NH$(C_6H_{11})$,

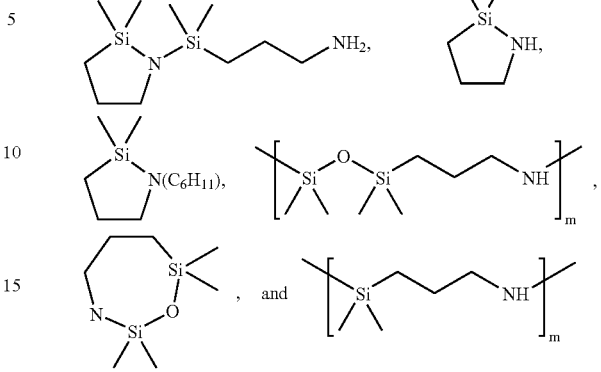

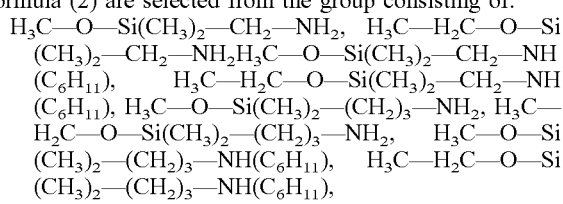, and

5. The process of claim 1, wherein, if b is at least 1, in a second step up to 95 percent by weight, based on all of the components employed, of chain extenders selected from the group consisting of diamines, isocyanate-blocked hydroxy compounds, dihydroxy compounds or mixtures thereof are additionally employed.

6. The process of claim 5, wherein at least one chain extender has the formula (6)

where
- D is a $C_{1-700}$ alkylene radical optionally substituted by fluorine, chlorine, $C_1$–$C_6$ alkyl or $C_1$–$C_6$ alkyl ester, in which nonadjacent methylene units are optionally replaced by —O—, —COO—, —OCO—, or —OCOO— groups, and
- Z is an oxygen atom or an amino group —NR'—.

7. The process of claim 1, which is carried out with exclusion of moisture and under an inert gas selected from the group consisting of nitrogen, argon, and mixtures thereof.

8. The process of claim 1, wherein at least one catalyst selected from the group consisting of dialkyl tin compounds and tertiary amines is added.

9. The process of claim 8, wherein at least one catalyst selected from the group consisting of dibutyl tin dilaurate, dibutyl tin diacetate, N,N-dimethylcyclohexanamine, 2-dimethylaminoethanol, and 4-dimethylaminopyridine is added.

10. The process of claim 1 which is a concerted process wherein at least a portion of each of aminosilane (2), organosilicon compound (3), diisocyanate (4), and optionally chain extender, are simultaneously present, and react to form copolymer (1).

11. The process of claim 10, wherein aminosilane (2), organosilicon compound (3), and diisocyanate (4) are metered into an extruder, react therein, and copolymer (1) is extruded from said extruder.

* * * * *

UNITED STATES PATENT AND TRADEMARK OFFICE
CERTIFICATE OF CORRECTION

PATENT NO. : 7,153,924 B2 Page 1 of 1
APPLICATION NO. : 10/854722
DATED : December 26, 2006
INVENTOR(S) : Juergen Kuepfer et al.

It is certified that error appears in the above-identified patent and that said Letters Patent is hereby corrected as shown below:

Column 12, line 15, claim 4:

Delete: 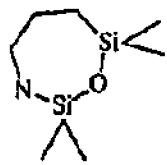

Insert therefor: 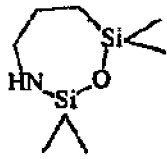

Signed and Sealed this

Twentieth Day of March, 2007

JON W. DUDAS
*Director of the United States Patent and Trademark Office*